(12) United States Patent
Ellis

(10) Patent No.: US 10,696,496 B2
(45) Date of Patent: Jun. 30, 2020

(54) MATERIAL CONVEYING APPARATUS AND METHOD

(71) Applicant: SCHENCK PROCESS UK LIMITED, Edinburgh (GB)

(72) Inventor: Richard Ellis, Yorkshire (GB)

(73) Assignee: SCHENCK PROCESS UK LIMITED, Edinburgh (GB)

( * ) Notice: Subject to any disclaimer, the term of this patent is extended or adjusted under 35 U.S.C. 154(b) by 0 days.

(21) Appl. No.: 16/315,152

(22) PCT Filed: Jun. 26, 2017

(86) PCT No.: PCT/GB2017/051859
§ 371 (c)(1),
(2) Date: Jan. 3, 2019

(87) PCT Pub. No.: WO2018/007787
PCT Pub. Date: Jan. 11, 2018

(65) Prior Publication Data
US 2019/0210817 A1    Jul. 11, 2019

(30) Foreign Application Priority Data

Jul. 4, 2016 (GB) .................................. 1611662.6

(51) Int. Cl.
*B65G 53/58* (2006.01)
*B65G 53/52* (2006.01)
(Continued)

(52) U.S. Cl.
CPC ............ *B65G 53/58* (2013.01); *B65G 53/521* (2013.01); *B65G 53/66* (2013.01); *B65G 53/20* (2013.01)

(58) Field of Classification Search
CPC ........ B65G 53/58; B65G 53/521; B65G 53/66
See application file for complete search history.

(56) References Cited

U.S. PATENT DOCUMENTS

| 4,515,503 A | 5/1985 | Snowdon |
| 4,861,200 A | 8/1989 | Lubbehusen et al. |
(Continued)

FOREIGN PATENT DOCUMENTS

| DE | 2919696 A | 2/1980 |
| DE | 102004047457 A1 | 4/2006 |
(Continued)

OTHER PUBLICATIONS

United Kingdom Patent Examination Report and Search Report dated Sep. 6, 2016 for Patent Application No. GB1611662.6.
(Continued)

*Primary Examiner* — William R Harp
(74) *Attorney, Agent, or Firm* — Moser Taboada

(57) ABSTRACT

Disclosed is a system for conveying particulate material, in which particulate material is conveyed along a conveying pipeline (117) by a flow of a conveying gas. A plurality of injector arrangements (121) are positioned along the conveying pipeline, for injecting a continuous flow of conveying gas into the pipeline. The system includes pressure differential apparatus for detecting whether a pressure differential in the pipeline between an injector arrangement and an adjacent injector arrangement is above or below a threshold value. In use each injector arrangement is operable to increase the flow rate at which conveying gas is injected into the pipeline when a pressure differential rises above the threshold value is detected between adjacent injection locations along the pipeline. The present invention provides a continuous flow of conveying gas at each of the plurality of injector arrangements, reducing the risk of blockage. Pressure differentials along the conveying pipeline are reduced. Together this facilitates stable and predictable conveying of the particulate material and reduced conveying gas usage.

20 Claims, 10 Drawing Sheets

(51) Int. Cl.
*B65G 53/66* (2006.01)
*B65G 53/20* (2006.01)

(56) References Cited

U.S. PATENT DOCUMENTS

| | | | |
|---|---|---|---|
| 4,909,676 A | | 3/1990 | Heep et al. |
| 4,955,761 A | * | 9/1990 | Federhen ............. B65G 53/525 |
| | | | 406/12 |
| 5,240,355 A | | 8/1993 | Hudalla |
| 5,584,612 A | | 12/1996 | Nolan |
| 6,106,202 A | | 8/2000 | Nolan |
| 6,386,800 B1 | * | 5/2002 | van Eyck ............. B65G 53/525 |
| | | | 406/14 |
| 6,935,813 B2 | * | 8/2005 | van Dorst ............. B65G 53/66 |
| | | | 137/114 |

FOREIGN PATENT DOCUMENTS

| | | | |
|---|---|---|---|
| GB | 1454114 A | | 10/1976 |
| GB | 1524585 A | | 9/1978 |
| GB | 2038750 A | | 7/1980 |
| GB | 2002881 B | | 2/1982 |
| GB | 2085388 A | | 4/1982 |

OTHER PUBLICATIONS

International Search Report for PCT Application No. PCT/GB2017/051859 dated Oct. 5, 2017.

* cited by examiner

MATERIAL CONVEYING APPARATUS AND METHOD

FIELD OF THE INVENTION

The invention relates to apparatus and methods for conveying particulate material through a pipeline, and in particular to the use of pressurisation or vacuum techniques to convey dense phase particulate material.

BACKGROUND TO THE INVENTION

Pneumatic conveying by pressure or vacuum are techniques employed to transport particulate materials along a pipeline. These techniques are typically employed to transport materials over distances typically in the range from 10 m to 500 m, and in some cases even further. Pneumatic conveying avoids the need for the use of conveyor belts or the like, which can be bulky and costly to maintain.

Pneumatic conveying techniques are particularly useful where material has to be transported along a complex path, or to multiple delivery points. These techniques also ensure that the particulate material can be entirely contained within a pipeline, which may avoid the need to deal with dust from or contamination of the material along the path of the conveying pipeline.

Dense phase positive pressure or vacuum pneumatic conveying is often used to transport dense phase particulates that are not suitable for conveying by suspension in a gas flow, such as materials prone to aggregate or coagulate, or particularly abrasive or friable materials. In dense phase pneumatic conveying, such materials are conveyed along a pipeline at relatively low velocities, often in a series of "material slugs". By keeping the transport velocity low, both pipeline wear and energy consumption is reduced.

A conventional pressurised dense phase pneumatic conveying system 1 is shown in FIG. 1(*a*). A particulate material 3 is delivered from a hopper 5, into a pressure vessel 7 (commonly referred to as a "transporter") via a material shut-off valve 9. The pressure vessel is pressurised with compressed air, delivered for example from a compressor 11*a* via a control valve 13. The pressurised air in the pressure vessel 7 expands into the conveying pipeline 17 and the air flow propels particulate material 15 along the pipeline to a delivery point (e.g. a second hopper, 19).

Dense phase vacuum conveying uses a similar principle. As shown in FIG. 1(*b*), instead of the pressure differential between the inlet and outlet of the conveying pipeline being achieved by pressurising the transporter, in vacuum conveying the pipeline inlet is at ambient pressure and the pressure at the outlet (for example in the second hopper 19) is reduced, by a vacuum pump 11*b*.

Some materials are unsuitable for dense phase conveying without additional assistive technologies being applied directly to the conveying pipeline. For example, some materials have low permeability to the motive gas flow. When combined with high friction between the particulate material and the inner wall of the pipeline, movement of the material can become erratic and unpredictable, which may lead to variable conveying rate performance and/or pipeline blockages.

To seek to address these issues, it is known to inject compressed air through a plurality of delivery points positioned at intervals along the pipeline length. However, this approach often requires higher volumes and/or pressures of compressed air. This additional consumption arises because air is unnecessarily injected at some points along the pipeline. In turn, the additional air flow increases the particulate material velocity along the pipeline, which may lead to increased pipeline wear or damage caused by contact with the particulate material.

One approach to minimizing air consumption has been to provide injectors along a pipeline with pressure transducers, and to inject compressed air via non-return valves only at specific injectors, in response to pressure conditions in the pipeline. Examples of such systems are described in U.S. Pat. Nos. 4,515,503, 5,584,612 and GB2085388. Systems which trigger gas injection above an absolute threshold pipeline pressure can be difficult to implement, because the required threshold pressure decreases along a pipeline (requiring individual adjustment) and can be dependent on the type of material being conveyed. GB2085388, for example, teaches that reference values for the pressure above which compressed air is injected, are selected for each type of material being conveyed.

These systems have several further drawbacks. Since they work on the principle of detecting an increased pipeline pressure characteristic of a material plug, and "pushing" the plug along the pipeline by injection additional air, the tendency is for each injector in turn to be switched on and remain on as the plug progresses down the pipeline, leading to wastage of air. In addition, injectors and non-return valves are prone to blockage when not in use, from contaminated backflow from the conveying pipeline.

Systems such as those described above are also prone under some circumstances to exacerbate problems by injecting gas upstream of a material plug, thereby compacting it.

U.S. Pat. No. 4,861,200 describes a system in which the pressure differential between a reference line and a conveying pipeline is measured ($\Delta p_n$) at each of a series of groups of injectors arrayed along the pipeline. A larger than expected pressure drop along the pipeline is indicative of a blockage and so the pressure differential switches are arranged such that, where $\Delta p_n$ exceeds $\Delta p_{n+1}$ at the adjacent groups of injectors downstream by a predetermined amount, compressed air is injected through the upstream injectors. The comparison to a reference value means that each pressure difference $\Delta p$ must be calibrated to a "idealised" pressure drop along the pipeline, which is once again material-specific.

Conveying velocity and pressure may also be limited by allowing excess conveying gas pressure and volume to "bypass" a material plug, for example via an internal fluted pipeline or external pressure release valve-controlled bypass loops. Again, however, the "bypass" arrangements may be prone to blockage and wear. In the case of internal bypass pipelines, repair or replacement can be particularly difficult and costly.

Accordingly, there remains a need to improvements to methods and apparatus for dense phase pneumatic conveying.

SUMMARY OF THE INVENTION

According to a first aspect of the invention there is provided a system for conveying particulate material, comprising:

a conveying pipeline having an inlet for receiving a quantity of particulate material and conveying gas, and an outlet; the system being configured to maintain the inlet at a higher pressure of conveying gas than the outlet;

a plurality of injector arrangements along the conveying pipeline, for injecting a continuous flow of conveying gas into the pipeline; and each injector arrangement associated with a pressure differential apparatus for detecting whether a pressure differential in the pipeline between the said injector arrangement an adjacent injector arrangement is above or below a threshold value;

in use, each injector arrangement operable to increase the flow rate at which conveying gas is injected into the pipeline from an injection flow rate to an increased injection flow rate, when a detected pressure differential a predetermined number of injector arrangements upstream or downstream thereof rises above the threshold value.

The present invention provides a continuous flow of conveying gas at each of the plurality of injector arrangements. The continuous flow prevents particulate material from entering any part of the injector arrangements, thereby reducing the risk of blockage of nozzles, valves and the like. The continuous injection of conveying gas along the pipeline also maintains a degree of permeability particulate material in the pipeline.

In pressurised or vacuum pneumatic conveying, a local reduction in the permeability of the particulate material can occur if the material begins to compact. If the process is allowed to continue, plugs of material or pipeline blockages can occur. A local reduction in permeability may cause localised pressure differentials along the conveying pipeline.

In use of the present invention, the injector arrangements respond to very small pressure differentials along the conveying pipeline, as result from small decreases in the permeability of the conveyed material. Such localised pressure differentials may also occur when a plug of material forms and arrives at one of the injector arrangements. In response, an injector arrangement increases the flow rate of injected conveying gas, so as to maintain material permeability, and prevent blockages from occurring.

This facilitates stable and predictable conveying of the particulate material and a lower overall amount of conveying gas is required for each unit mass of particulate material conveyed. Thus, the energy requirements of the system are reduced.

The threshold pressure differential between adjacent injector arrangements is also independent of position along the conveying pipeline, the material being conveyed and of the absolute pressure conditions within the conveying pipeline.

In addition, the injector arrangements are independently operable, enabling the system to respond to two more detected pressure differentials at the same time.

The invention has been found to be particularly effective when each injector arrangement is operable to increase the flow rate at which conveying gas is injected into the pipeline, when the detected pressure differential is a predetermined number of injector arrangements upstream thereof.

This finding is contrary to the approach adopted in existing systems, in which gas is injected at or upstream of a detected pressure abnormality in a conveying pipeline. It is proposed that, since the invention "pre-emtively" increases the injection flow rate before a material plug or blockage properly forms, the material having locally decreased permeability progresses towards a downstream injector arrangement within the timescales in which the increased injection flow rate is effective.

Each injector arrangement may be operable to increase the flow rate at which conveying gas is injected into the pipeline, when the detected pressure differential is between it and an adjacent injector arrangement.

Alternatively or in addition, each injector arrangement may be operable to increase the flow rate at which conveying gas is injected into the pipeline, when the detected pressure differential is between two further injector arrangements adjacent one another.

The flow rate of the $n^{th}$ injector arrangement may be increased based on a pressure differential between the $(n+m)^{th}$ and the adjacent $(n+m+1)^{th}$ injector arrangement—i.e. based on a downstream pressure differential.

Advantageously, the flow rate of the $n^{th}$ injector arrangement may be increased based on a pressure differential between the $(n-m)^{th}$ and the adjacent $(n-m-1)^{th}$ injector arrangement—i.e. based on an upstream pressure differential.

The value of m may be 0, 1 or 2 and in some cases more than 2.

The apparatus may comprise one or more terminal injector arrangements, by which we mean injector arrangements at or near the inlet or the outlet of the pipeline, such that a pressure differential above the threshold value cannot be detected a predetermined number of injector arrangement upstream or downstream thereof, because the terminal injector arrangements have fewer than the predetermined number of injector arrangements upstream or downstream thereof, as the case may be.

The terminal injector arrangements may be configured differently from the other, non-terminal injector arrangements.

For example, where m=2 and the system is configured for the plurality of (non-terminal) injector arrangements to respond to detected above-threshold pressure differentials upstream thereof, the first and second injector arrangements along the pipeline may be terminal injector arrangements and may lack the ability to increase the flow rate of injected conveying gas. Alternatively, the second (terminal) injector arrangement may increase the injection flow rate based on a pressure differential to the adjacent first (terminal) injector arrangement.

The terms upstream and downstream, inlet, outlet and other such relative terms are expressed in relation to the direction in which the particulate material is intended to be conveyed in normal use of the system.

By "permeability" of conveyed particulate material, we refer to the resistance that is imposed against a flow of conveying gas through the pipeline.

In pressurised or vacuum pneumatic conveying, the conveying gas flows along the conveying pipeline at a higher speed than the particulate material. Thus, the particulate material is, to some degree, "permeable" to the flow of conveying gas. A lower permeability implies a higher flow resistance, and may be associated with a greater degree of particle compaction and friction against the pipeline (typically resulting in higher overall conveying pressure). Conversely, a higher permeability implies a lower flow resistance, and may be associated with less particle compaction and friction. In turn, this results in a lower overall conveying pressure for a given mass flow rate.

The system may comprise a transporter apparatus for delivering a quantity of particulate material under a system pressure of a conveying gas, to the inlet of the conveying pipeline. In use the system pressure is maintained (e.g. by way of a compressor) at a pressure above the pressure at the outlet. For example, the outlet may be at ambient pressure and the system pressure may be at a higher pressure. The system may be a pressurised pneumatic conveying system.

The system may comprise a receiving vessel, such as a hopper, for receiving particulate material from the conveying pipeline. In use the receiving vessel may be maintained at a pressure below the pressure at the inlet. The inlet may be at ambient pressure and the receiving vessel may be at a reduced pressure. For example may communicate with a vacuum pump for pumping conveying gas from the receiving vessel. The system may be a vacuum pneumatic conveying system.

For the avoidance of doubt, references herein to "the detected pressure differential" refer to the detected pressure differential a predetermined number of injector arrangements upstream or downstream of a said injector arrangement.

Each injector arrangement may be configured to reduce the flow rate at which conveying gas injected into the pipeline from the increased injection flow rate to the injection flow rate, when the detected pressure differential falls below the threshold value.

It will be appreciated that, at least temporarily, the increased injection flow rate may be associated with a local increase in conveying gas pressure, as the particulate material locally adjusts to the new conditions.

Indeed, the pressure at which the conveying gas is injected may increase or decrease with injection flow rate. For example, at the injection flow rate, the injection pressure may be lower than the increased injection pressure at the increased injection flow rate. Thus, in use, each injector arrangement may be operable to increase the pressure at which conveying gas is injected into the pipeline from an injection pressure to an increased injection pressure, when the said pressure differential rises above the threshold value.

The conveying gas may be injected at the increased injection flow rate for around 0.0001 to 5 seconds, or around 0.0001 to 3 seconds, or around 0.0001 to 2 seconds, or around 0.0001 to 1 second. In some circumstances, the conveying gas is injected at the increased injection flow rate for around 0.5 seconds.

The length of time for which an injection injects conveying gas at the increased injection flow rate may depend on how long it takes for pressures within the conveying pipeline to re-equilibrate. Factors determining for how long the increased injection flow rate is used, include the degree to which the permeability of the particulate material has decreased (e.g. how much a plug has compacted), the position of a region of decreased permeability in relation to an injection arrangement, or how long it takes for a plug to be "aerated" or broken apart, so as to increase permeability.

Each injector arrangement may be operable to inject conveying gas into the pipeline at the injection flow rate, when the detected pressure differential is below the threshold value, and to inject conveying gas into the pipeline at the increased injection flow rate, when the detected pressure differential rises above the threshold value.

Each injector arrangement may be configured to reduce the flow rate at which the conveying gas is injected as soon as the detected pressure differential falls below the threshold value.

Alternatively, there may be a delay between the detected pressure differential falling below the threshold value and the reduction in the flow rate at which the conveying gas is injected. Thus, the flow rate at which the conveying gas is injected may remain at the increased injection flow rate of a selected time period after as soon as the detected pressure differential falls below the threshold value, in particular in relation to embodiments having a said control unit or units by which the injection flow rate of the conveying gas is controlled.

The threshold pressure differential may be of the order of millibars. For example the threshold pressure differential may be between around 0.1 and 1000 mBar, or between around 1 and 500 mBar, or between around 5 and 200 mBar, or between around 10 and 100 mBar.

Some particulate materials may stably progress along a conveying pipeline as a series of permeable plugs, without this leading to blockage. In certain circumstances, the increased injection flow rate may be triggered whenever a material plug passes between adjacent injector arrangements. When the system is configured in this way, the temporarily increased injection flow rates from each injector arrangement in turn (as the plug progresses along the pipeline) may again be regarded as a preventative measure against pipeline blockage or unstable conveying of the particulate material.

The system pressure, and/or the pressure difference between the inlet and the outlet, and/or the injection flow rate may vary depending on, for example, the conveying pipeline length and diameter, the nature of the particulate material being conveyed, ambient temperature in the pipeline and other factors as known to one skilled in the art.

The system pressure (i.e. absolute pressure) may for example be in the range from 0.1 to 100 Bar, or between around 0.5 to 20 Bar. The injection flow rate at an injection arrangement may for example be in the range from around 0.0001 to 100 $m^3$/min, or 0.01 to 100 $m^3$/min (based on the equivalent volume of air at atmospheric pressure), or in the range from around 0.1 to 60, or 55 $m^3$/min. In some embodiments, the injection flow rate can be around 0.01 $Sm^3$/min.

The system may be configured such that the system pressure may be the same as the injection pressure, so that the system pressure never exceeds the injection pressure, or so that the system pressure is always below the injection pressure.

The injection flow rate (and/or pressure) of an injector arrangement may exceed the injection flow rate/pressure of an adjacent injector arrangement downstream thereof. For example, the flow rate of conveying gas may progressively increase or decrease along the conveying pipeline form the inlet to the outlet. Alternatively, the flow rates and pressures at which conveying gas is injected may be the same at each injector arrangement.

The increased injection flow rate may cause a localised pressure build up in the conveying pipeline sufficient to cause a local increase in particulate material permeability. The increased injection flow rate may cause a localised pressure build up in the conveying pipeline sufficient to dislodge a material plug which has become blocked in the conveying pipeline. Injecting conveying gas at the increased injection flow rate may disrupt a material plug so as to reduce its size, or aerate or to some degree fluidize the plug, so as to increase its permeability.

The increased injection pressure may be selected for example based on the nature of the conveyed material, the pipeline dimensions, the system or injection pressures, temperature and the like.

The increased injection flow rate is typically at least 2, 3, 5, 7 or 10 or more times the injection flow rate. For example, where the injection flow rate is around 0.01 $Sm^3$/min, the increased injection flow rate may in come embodiments be between around 0.02-0.1 $Sm^3$/min, e.g. around 0.07 $Sm^3$/min.

In order to achieve the increased injection flow rate, the increased injection pressure at which the injector arrangement injects conveying gas may typically be between around 0.1 to 3 Bar higher than the injection pressure. Alternatively, a larger flow area may be employed, so as to achieve a greater flow rate for a given injection pressure.

The pressure differential apparatus may be configured to detect whether the pressure differential in the pipeline between an injector arrangement an adjacent injector arrangement upstream and/or downstream thereof, is above or below a threshold value.

The pressure differential apparatus may be configured to detect a pressure differential between adjacent injector arrangements, for example between portions of the injector arrangements in fluid communication with the conveying pipeline. The pressure differential apparatus may be configured to detect a pressure differential between respective regions of the conveying pipeline proximal to the adjacent injector arrangements.

The pressure differential apparatus may be configured to detect pressure differential information.

Pressure differential information may comprise an indication that the pressure differential is above or below the threshold value, or may comprise a value of a pressure differential, or a property related thereto. For example, a pressure differential information may comprise the configuration of a device sensitive to a pressure differential, or may comprise a signal output by an electrical or electromechanical device sensitive to a pressure differential, such as a piezoelectric device.

Each injector arrangement may comprise pressure differential apparatus. Advantageously, the pressure differential apparatus may be located upstream of the continuous flow of conveying gas being injected into the pipeline. In this way, the pressure differential apparatus is protected from contamination, damage or wear that might otherwise result from contact with particulate material being conveyed in the pipeline. In turn, this facilitates the use of more sensitive pressure differential apparatus.

A pressure differential apparatus of a said injector arrangement may be in fluid pressure communication with an adjacent injector arrangement (upstream and/or downstream thereof) or with an inside of the conveying pipeline proximal to an adjacent injector arrangement.

A pressure differential apparatus of a said injector arrangement may be configured to respond to pressure differential information (such as the configuration of a device sensitive to a pressure differential) so as to regulate the injection flow rate into the conveying pipeline.

A pressure differential apparatus of a said injector arrangement may alternatively or in addition be configured to convey pressure differential information to a further injector arrangement a predetermined number of injector arrangements upstream and/or downstream thereof. The pressure differential information may be conveyed directly (e.g. an electrical signal) or indirectly (e.g. a pressure in a line resulting from the operation of a pressure differential sensitive device such as a valve).

For example, a pressure differential apparatus may comprise a valve coupled to a pressure differential actuator, such as a diaphragm or a piston actuator. A first side of the pressure differential actuator may be in fluid communication with an injector arrangement (or the conveying pipeline proximally thereto), and a second side of the pressure differential actuator may be in fluid communication with an adjacent injector arrangement (or the conveying pipeline proximally thereto).

On detection of a pressure differential above the threshold pressure differential between the first and second sides of the pressure differential actuator, the valve may be actuated so as to change the flow rate at which the conveying gas is injected by the injector arrangement, or by an injector arrangement upstream or more preferably downstream thereof, as discussed further herein. A pressure differential apparatus may comprise a differential pressure transducer, operable to output a signal indicative that the threshold pressure differential has been exceeded, or indicative or related to a pressure differential.

A pressure differential apparatus of an injector arrangement may be configured to convey pressure differential information to two or more injector arrangements upstream and/or downstream thereof.

A pressure differential may be determined based on measurements of pressure or a related property, by pressure sensors associated with adjacent injector arrangements.

The system may comprise a control unit in communication with pressure sensors of (or associated with) adjacent injection arrangements, operable to determine whether the threshold pressure differential is exceeded. The control unit may be in communication with sensors associated with more than two of, or each of the injector arrangements.

Each injector arrangement may comprise a control unit.

Each injector arrangement may comprise a flow rate adjustment arrangement, for changing the flow rate of the injected conveying gas.

An injector arrangement may for example comprise an adjustable device such as an adjustable valve (e.g. a needle valve, ball valve, adjustable aperture valve or the like) or an adjustable flow controller or restrictor, or an adjustable nozzle. In some embodiments, such adjustable devices are electromechanically actuated. In some embodiments, such adjustable devices are pressure-actuated; i.e. under the action of fluid pressure (e.g. as a consequence of a said fluid pressure differential).

In some embodiments, the injector arrangements are supplied with conveying gas from a high pressure manifold (the manifold being at a pressure at or above the pressure at which conveying gas is supplied to the pipeline). The flow rate adjustment arrangements may be configured to vary the setting of an adjustable device, so as to vary a pressure drop between the manifold and the gas injected into the conveying pipeline, and thus the flow rate of the injected conveying gas.

Each injector arrangement may comprise a high flow rate injection pathway and a low flow rate injection pathway, between a source of conveying gas (e.g. manifold) and the conveying pipeline. Each flow rate adjustment arrangement may be configured to selectively route the conveying gas via the high flow rate injection pathway (for example comprising a large diameter flow restrictor, or no flow restrictor), or via the low flow rate injection pathway (for example comprising a small diameter flow restrictor).

The flow rate adjustment arrangement may comprise a multi-way (e.g. 2-way or 3 way) valve, operable to select the high or low flow rate injection pathway.

The multi-way valve may be pressure-actuated. For example, the multi-way valve may be coupled to or comprise a diaphragm actuator or a pressure differential piston actuator.

The multi-way valve may be electromechanically actuated.

An electromechanically actuated adjustable device may comprise or communicate with a control unit.

In some embodiments, each injector arrangement comprises a control unit for controlling an electromechanically actuated or adjustable device, based on received pressure differential information. Said control unit may form part of the flow rate adjustment arrangement. In some embodiments, a single control unit is configured to control more than one of or all of the flow rate adjustment arrangements.

A said control unit may communicate with both pressure differential apparatus and a flow rate adjustment arrangement.

It will be appreciated that such electronic control may be effected in a variety of ways, with signals being communicated between electromechanical devices and/or pressure differential apparatus, and one or more control units associated with the injector arrangements.

The system may comprise a processing resource, forming part of a control unit or issuing control instructions to one or more said control units, based on pressure differential information. For example the system may comprise a computer processor, or one or more computer processors in communication with one another. The system may comprise associated computer apparatus, such as programmable or fixed memory and the like.

In some circumstances, the increase of the injection flow rate, on detection of an above-threshold pressure differential, as described above, may not be sufficient to move or disrupt a material plug. Under such circumstances, it may be required to further increase the injection flow rate.

One way that this can be achieved is to further increase the injection flow rate locally, at a said injection arrangement (e.g. by further adjustment of a flow rate adjustment arrangement).

Alternatively, or in addition, under some circumstances it may be required to increase the injection flow rate at a group of, or at all of, the injection arrangements. The system may be configured to detect such circumstances and increase injection flow rate accordingly.

The system may for example be configured to determine a system pressure. A system pressure may be determined based on pressure measurements from a series of pressure sensors along the conveying pipeline (e.g. an average value).

The system pressure may be measured by a pressure sensor at the inlet or in the transporter apparatus. A pressure measurement at the inlet or transporter apparatus may be indicative of resistance to delivering particulate material into the conveying pipeline.

An increase in system pressure for longer than a predetermined period may indicate a need to increase the injection flow rates along the pipeline. For example, if the system pressure remains elevated for longer than, for example between around 1 and 180 seconds, or between 1 and 120 seconds, or between around 1 and 60 or 5 and 60 seconds, the flow rates along the pipeline may be increased.

Other indications may include detecting above-threshold pressure differentials at or above a certain frequency, or detecting greater than a certain number of above-threshold pressure differentials at a given time. A need to increase injection flow rate may be determined based on a combination of such indications.

On detection of a system pressure above a predetermined system pressure threshold, the injection flow rate at one or more, or in some cases all, of the injector arrangements may be increased (for example to the increased injection flow rate).

In embodiments in which a high pressure of conveying gas is supplied to the injector arrangements, typically via a manifold, supply pressure may be increased on detection of an elevated system pressure. Increase of the supply pressure in this way may cause the injection flow rate to increase (for example where the injector arrangements comprise flow restrictors). Indeed, a supply pressure increase may also cause the system to operate at a generally higher pressure.

It may be preferable for the injection flow rates to be elevated temporarily, following which the system pressure can again be monitored to determine whether it returns to normal.

The above described feedback between the injection flow rate(s) and system pressure may provide a mechanism by which the system calibrates, so as to find a system pressure and injection flow rate suitable for a particular type of particulate material. For example the injection flow rate and system pressure may be progressively increased until the rate or number of above-threshold pressure differentials is at an acceptable level.

It will be understood that certain of the modes of operation described herein are effected by way of the one or more control units and/or processing resources. For example, control over multiple injection arrangements together, or delays to monitor the effects of a change in injection flow rate, increased injection flow rate, system pressure and the like, may be facilitated by electronic control over said parameters.

The system may comprise any suitable type of transporter apparatus as known in the art. For example, the transporter apparatus may comprise; a pressure vessel having an inlet port, for receiving particulate material; an outlet port extending to the conveying pipeline through which particulate material may be delivered under a pressure of conveying gas; and a conveying gas inlet, through which the pressure vessel may be pressurised to the system pressure.

The inlet port may comprise a pressure isolation valve, such as a rotary valve or material shut off valve.

In use, the pressure of conveying gas in the transporter apparatus may be elevated to the system pressure, prior to delivering an amount of the particulate material into the pipeline. The pressure of conveying gas in the transporter may be maintained at the system pressure.

The transporter apparatus may be gravity fed with particulate material, for example from a hopper. The system may for example comprise a hopper having an outlet above the inlet port of the transporter (optionally connected via a length of a conduit).

The inlet port and outlet port are typically electronically regulated, for example by a control unit. The conveying gas inlet may in some embodiments also be electronically controlled, so as to regulate the system pressure. The conveying gas inlet may be pneumatically controlled, to regulate the system pressure. Such pneumatic control or a pneumatically controllable device may be controlled by way of a control unit.

Said control unit, or a processing resource issuing instructions thereto, may form part of or communicate with controller(s)/processing resource(s) associated with the injector arrangements as described herein.

Conveying gas may be provided to the various parts of the system (the transporter apparatus, each of the injector arrangements, a manifold and so forth) from a single source. For example the system may be connected or connectable to a source of a compressed gas, such as a compressed gas cylinder or, more commonly, a compressor.

The system may comprise a compressor.

The conveying gas may be any suitable gas. Most typically, the conveying gas is air. However, other gasses may be preferred for certain applications. For example, an inert gas such as nitrogen or carbon dioxide may be used to convey perishable or oxygen-sensitive materials.

The conveying pipeline may have a straight, curved or convoluted pathway.

The injector arrangements may be equally spaced along the conveying pipeline, or along portions of the conveying pipeline. The pathway of the pipeline may require that the spacing of the injector arrangements varies in some parts of the pipeline. For example, particulate material may be more prone to blocking at bends in the pipeline, which may therefore benefit from a closer spacing of injector arrangements in their vicinity. The spacing may be selected according to the particular application, and may depend of factors such as pipeline diameter, gradient and so forth.

The injector arrangements are spaced typically at around 1 m to 20 m apart along the conveying pipeline, or between around 1-12 m, or 1-6 m apart. The spacing may be for example around 6 m, or 12 m between adjacent injector arrangements.

The conveying pipeline may comprise more than one outlet. For example the pipeline may comprise two or more outlets and be configured such that particulate material may be directed selectively to one of the outlets.

The conveying pipeline may comprise more than one inlet, and apparatus associated therewith; for example to facilitate transport of more than one type of particulate material.

The system may be a dense phase conveying system, for transporting dense phase particulate materials such as sodium sulphate, sodium carbonate, sand, gypsum, alumina, metallurgical coke, clinker, metallic dust and concentrates, or other inorganic salts, catalyst substrates and the like.

In a second aspect of the invention there is provided an injector arrangement for injecting a continuous flow of conveying gas into a particulate material conveying pipeline, the injector arrangement comprising:
  a pressure differential apparatus for detecting whether a pressure differential is above or below a threshold value;
  an injector outlet, for connection to a conveying pipeline, through which in use conveying gas may be injected into the pipeline;
    the injector arrangement operable to receive pressure differential information and increase the flow rate at which conveying gas is injected from the injector outlet, from an injection flow rate to an increased injection flow rate, when the received pressure differential information corresponds to a detected pressure differential rising above the threshold value.

The pressure differential information may be received from the pressure differential apparatus. Thus, the injector arrangement may be operable to increase the flow rate at which conveying gas is injected from the injector outlet, from an injection flow rate to an increased injection flow rate, when the said pressure differential rises above the threshold value.

The pressure differential information may in use be received from another pressure differential apparatus, for example from another injector arrangement. The injector arrangement may therefore be connectable with another pressure differential apparatus.

The injector arrangement may comprise a supply inlet, for connection to a supply of conveying gas.

In use, the pressure differential apparatus may be placed in fluid pressure communication with a conveying pipeline proximal to the injector arrangement (i.e. where conveying gas is injected into the pipeline by the injector arrangement), or may be in fluid pressure communication with a part of the injector arrangement itself, for example upstream of the injector outlet.

In addition, the pressure differential apparatus may be configured to be placed in fluid pressure communication with an adjacent injector arrangement, or proximal region of a conveying pipeline. For example, the pressure differential apparatus may have a port, for connection to another conduit.

Alternatively, the pressure differential apparatus may be configured to receive pressure information from pressure sensors at each location, and determine a pressure differential therefrom.

The injector arrangement may comprise a flow rate adjustment arrangement, for changing the flow rate of the injected conveying gas.

The flow rate adjustment arrangement may for example comprise an adjustable device such as an adjustable valve, flow controller, restrictor or nozzle. In some embodiments, the adjustable device is electromechanically actuated. In some embodiments, the adjustable devices is pressure-actuated (i.e. under the action of fluid pressure or a fluid pressure differential).

The flow rate adjustment arrangement may be configured to vary the setting of an adjustable device such as an adjustable flow restrictor, so as to vary a pressure drop between the supply inlet and the injector outlet.

The flow rate adjustment arrangement may be configured to selectively route conveying gas between the supply inlet and injector source and outlet, via a high flow rate injection pathway, or via a low flow rate injection pathway.

The flow rate adjustment arrangement may comprise a multi-way valve, operable to select a high or low flow rate injection pathway. The multi-way valve may be electromechanically actuated. The multi-way valve may be pressure-actuated. For example, the multi-way valve may be coupled to or comprise a diaphragm actuator or a pressure differential piston actuator.

The injector arrangement may comprise a control unit for controlling an electromechanically actuated adjustable device. The control unit may form part of the flow rate adjustment arrangement. The control unit may communicate with both pressure differential apparatus and a flow rate adjustment arrangement.

The injector arrangement may be retrofittable to a conveying pipeline. Retrofitting of a plurality of the injector arrangements may provide for the improved performance disclosed herein.

According to a third aspect of the invention there is provided a method of conveying particulate material along a conveying pipeline, the method comprising;
  introducing a quantity of the particulate material into the pipeline;
  conveying the particulate material along the pipeline under the action of a flow of a conveying gas along the conveying pipeline;
  injecting a continuous flow of conveying gas into the pipeline at a plurality of injection locations along the pipeline; and
  increasing the flow rate of the conveying gas injected into the pipeline at a said location, from an injection flow rate to an increased injection flow rate, when a pressure differential rising above a threshold value is detected in the pipeline between adjacent injection locations a predetermined number of injection locations upstream or downstream thereof.

The flow rate at the said injection location may be increased when the detected pressure differential is between it and an adjacent injection location.

The flow rate at the said injection location may be increased when the detected pressure differential is between two further injection locations adjacent one another.

The flow rate at the $n^{th}$ injection location may be increased based on a pressure differential between the $(n+m)^{th}$ and the adjacent $(n+m+1)^{th}$ injection location—i.e. based on a downstream pressure differential.

Advantageously, the flow rate of the $n^{th}$ injection location may be increased based on a pressure differential between the $(n-m)^{th}$ and the adjacent $(n-m-1)^{th}$ injection location— i.e. based on an upstream pressure differential.

The value of m may be 0, 1 or 2 and in some cases more than 2.

The flow of conveying gas along the conveying pipeline may result from a pressure difference between an inlet and an outlet of the conveying pipeline. The method may comprise conveying the particulate material under the action of a system pressure of conveying gas, applied for example at or upstream of the inlet to the pipeline. Alternatively (or in addition) the method may comprise causing a reduced pressure at the outlet of the conveying pipeline, for example by pumping conveying gas from a receiving vessel downstream of the outlet.

The method may comprise detecting pressure differentials between each adjacent injection location.

The method may comprise introducing the particulate material at a system pressure at or below an injection pressure (at which conveying gas is injected into the pipeline). The method may comprise progressively reducing the pressure and/or flow rate of the injected conveying gas along the conveying pipeline from the inlet to the outlet.

The method may comprise detecting an above-threshold pressure differential and increasing the flow rate of the conveying gas injected at a said injection location to a flow rate sufficient to increase the permeability of particulate material in the conveying pipeline proximal thereto. The increased injection flow rate may dislodge a material plug which has become blocked in the conveying pipeline. Injecting conveying gas at the increased injection flow rate may disrupt a material plug so as to reduce its size, or aerate or to some degree fluidize the plug, so as to increase its permeability.

The method may comprise decreasing the flow rate of the conveying gas injected into the pipeline at a said injection location, from the increased injection flow rate to the injection flow rate, after a fixed time period, for example after around 0.0001 to 5 seconds, or around 0.0001 to 3 seconds, or around 0.0001 to 2 seconds, or around 0.0001 to 1 second, or after around 0.5 seconds.

The method may comprise decreasing the flow rate of the conveying gas into the pipeline at a said injection location, from the increased injection flow rate to the injection flow rate, when the detected pressure differential falls below a threshold value.

The flow rate may be decreased as soon as the detected pressure differential falls below the threshold value.

The method may alternatively comprise maintaining the increased injection flow rate at said injection location for a selected time period after the detected pressure differential falls below the threshold value.

The method may comprise further increasing the increased injection flow rate at an injection location, or at a group of injection locations.

The method may comprise detecting an above-threshold pressure differential between a first injection location and an adjacent (upstream or downstream) second injection location and increasing the injection flow rate the first injection location and/or at a third injection location. The third injection location may be two or more injection locations upstream or more preferably downstream of the first injection location.

The method may comprise increasing the injection flow rate at more than one injection location upstream or downstream of the first injection location. For example, the flow rate may be increased adjacent injection locations (or a group of three or more).

The injection flow rate may be further increased when the system pressure exceeds an acceptable system pressure for a predetermined period. The injection flow rate may be further increased if a given above-threshold pressure differential recurs immediately, or if the above-threshold pressure differential persists.

The method may comprise increasing the injection flow rate at each of the injection locations. The injection flow rate may be increased for example if the system pressure (e.g. as measured at or upstream of the pipeline inlet) increases.

The injection flow rate may be increased if the rate of detected above-threshold pressure differentials is above a certain frequency, or when greater than a set number of above-threshold pressure differentials are detected along the pipeline at a given time.

A need to increase the injection flow rate, or further increase the increased injection flow rate may be determined based on a combination of such indications.

The method may comprise increasing the pressure at which conveying gas is supplied to each of the injection locations (for example to injector arrangements at each said location), so as to increase both the injection and increased injection flow rates.

The method may comprise increasing the supply pressure. The supply pressure may for example be increased on detection of an elevated system pressure, and/or above a certain frequency or number of detected above-threshold pressure differentials.

The system pressure and injection flow rates may be varied independently, or together with one another.

The method may comprise increasing the injection/increased injection flow rates temporarily, returning to the original flow rates and then monitoring the pressure differentials and/or the system pressure to determine whether it returns to normal.

The method may comprise conveying a dense phase particulate material along the pipeline.

Further preferred and optional features of each aspect of the invention correspond to preferred and optional features of each other aspect of the invention. For example, the method may comprise steps associated with the operation of any of the preferred or optional features of the apparatus, as described in relation to the first and second aspects.

DESCRIPTION OF THE DRAWINGS

Non-limiting example embodiments will now be described with reference to the following drawings in which.

DETAILED DESCRIPTION OF EXAMPLE EMBODIMENTS

Figure 1A:
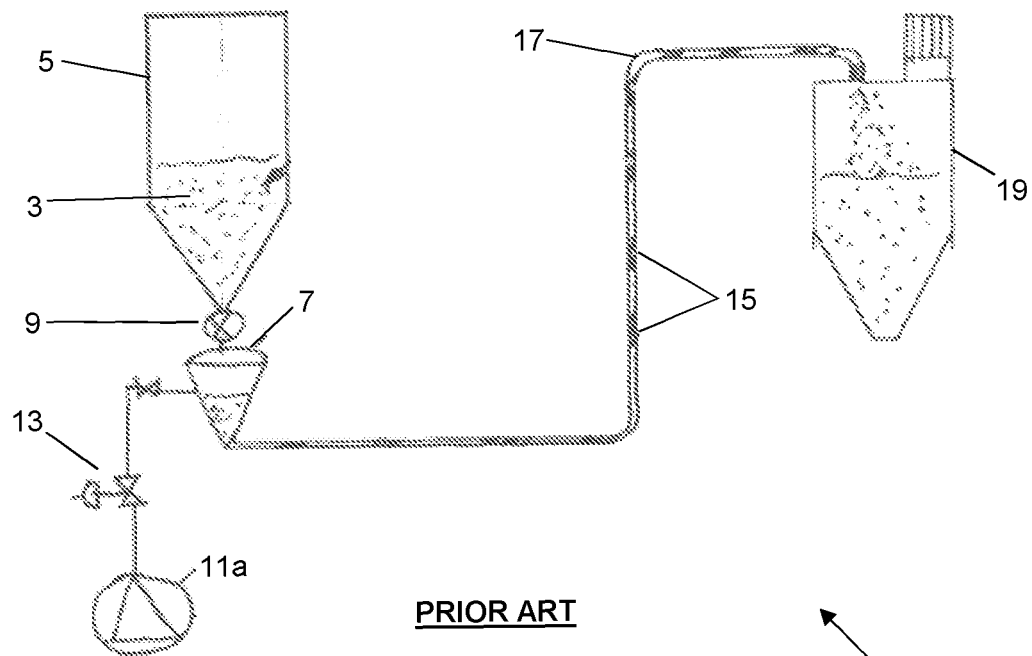
FIGS. 1(*a*) and 1(*b*) show schematic views of (a) a prior art pressurised pneumatic conveying system and (b) a prior art vacuum pneumatic conveying system.
Figure 1B:
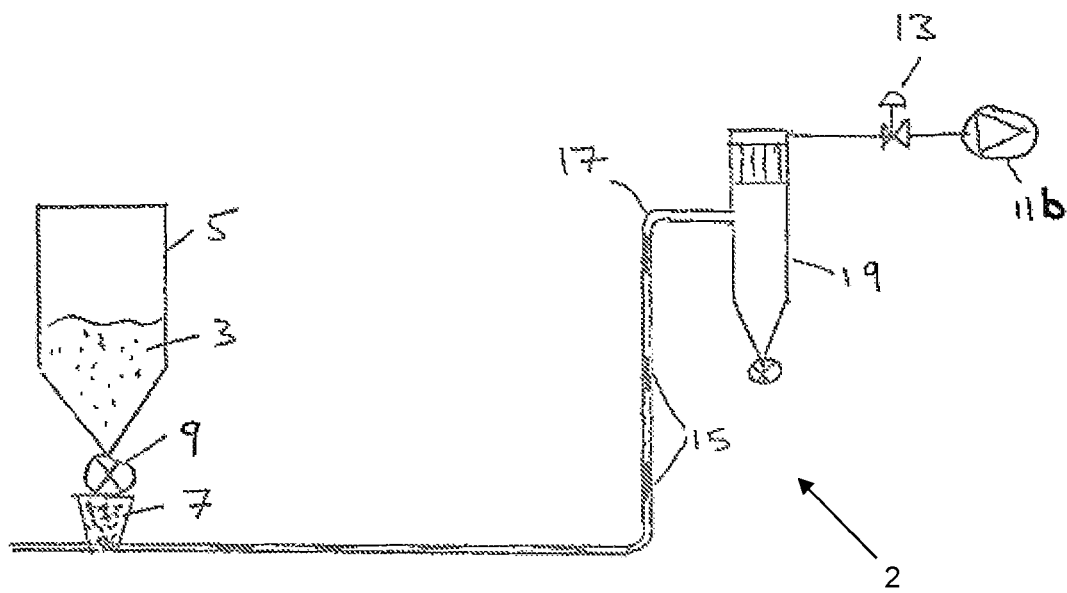
Figure 2:
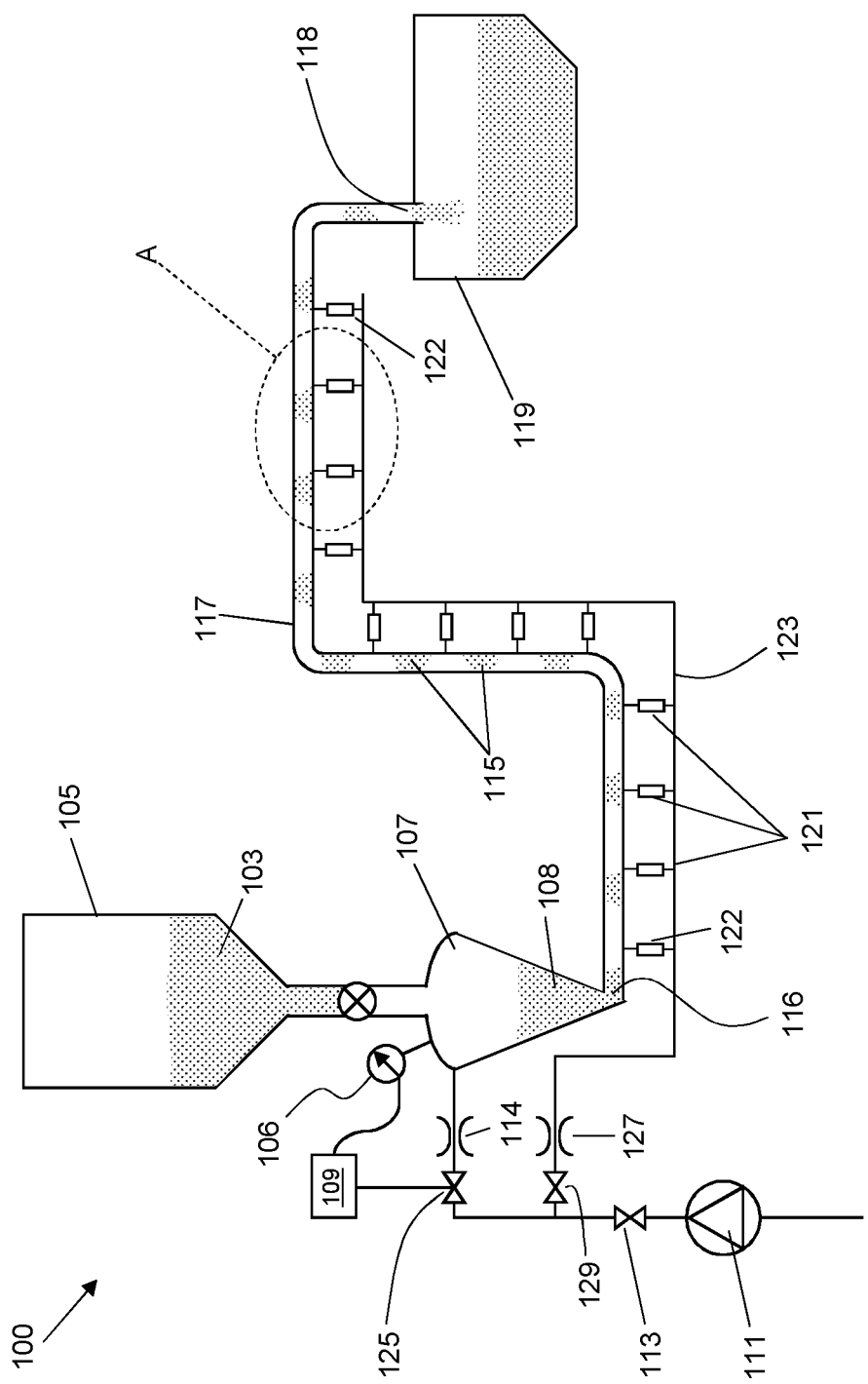
FIG. 2 shows schematic view of a conveying system having a plurality of injector arrangements along a conveying pipeline.

FIGS. 1(a) and (b) show a conventional dense phase pressurised and vacuum pneumatic conveying systems 1 and 2, as described above. FIG. 2 shows an embodiment of a system 100 for conveying particulate material in accordance with the invention. Features in common with the systems 1 and 2 are provided with like reference numerals, incremented by 100.

The system 100 has a transporter apparatus 107, for delivering a quantity of particulate material 108 into an inlet 116 of the conveying pipeline 117. Particulate material 103 is received into the transporter apparatus 107 from a hopper 105 positioned above the transporter apparatus, via a material shut-off valve 109. The transporter apparatus 107 is pressurised to a system pressure of conveying gas (in the present embodiment, compressed air) which is fed from a compressor 111 via conduit 112. The system 100 is typically coupled to a plant compressed air supply (of which the compressor 111 forms a part). The pressure of compressed air from the compressor is typically in the range from around 2.5 Bar to 12 Bar, and therefore much higher than the required system pressure of around 2 to 11 Bar of the system 100. Accordingly, a valve 113 and flow restrictor 114 regulates flow from the compressor. The system pressure may be further adjusted by adjustable valve 125, as described in further detail below.

The conveying pipeline 117 extends from the inlet 116 to an outlet 118, to a hopper 119.

In alternative embodiments, in which vacuum pneumatic conveying is employed (not shown), the transporter is at atmospheric pressure, and the pressure in a receiving vessel (in place of the hopper 119 in FIG. 2) is reduced by a vacuum pump.

A plurality of injector arrangements 121 are positioned along the conveying pipeline 117, and in use each inject a continuous flow of the conveying gas into the conveying pipeline. The injector arrangements 121 are supplied with compressed air from the compressor 111, via a high pressure manifold 123. A further flow restrictor 127 and adjustable valve 129 are positioned between the compressor and the manifold, to provide further regulation of the injected conveying gas, which will also be described in further detail below.

Figure 3:
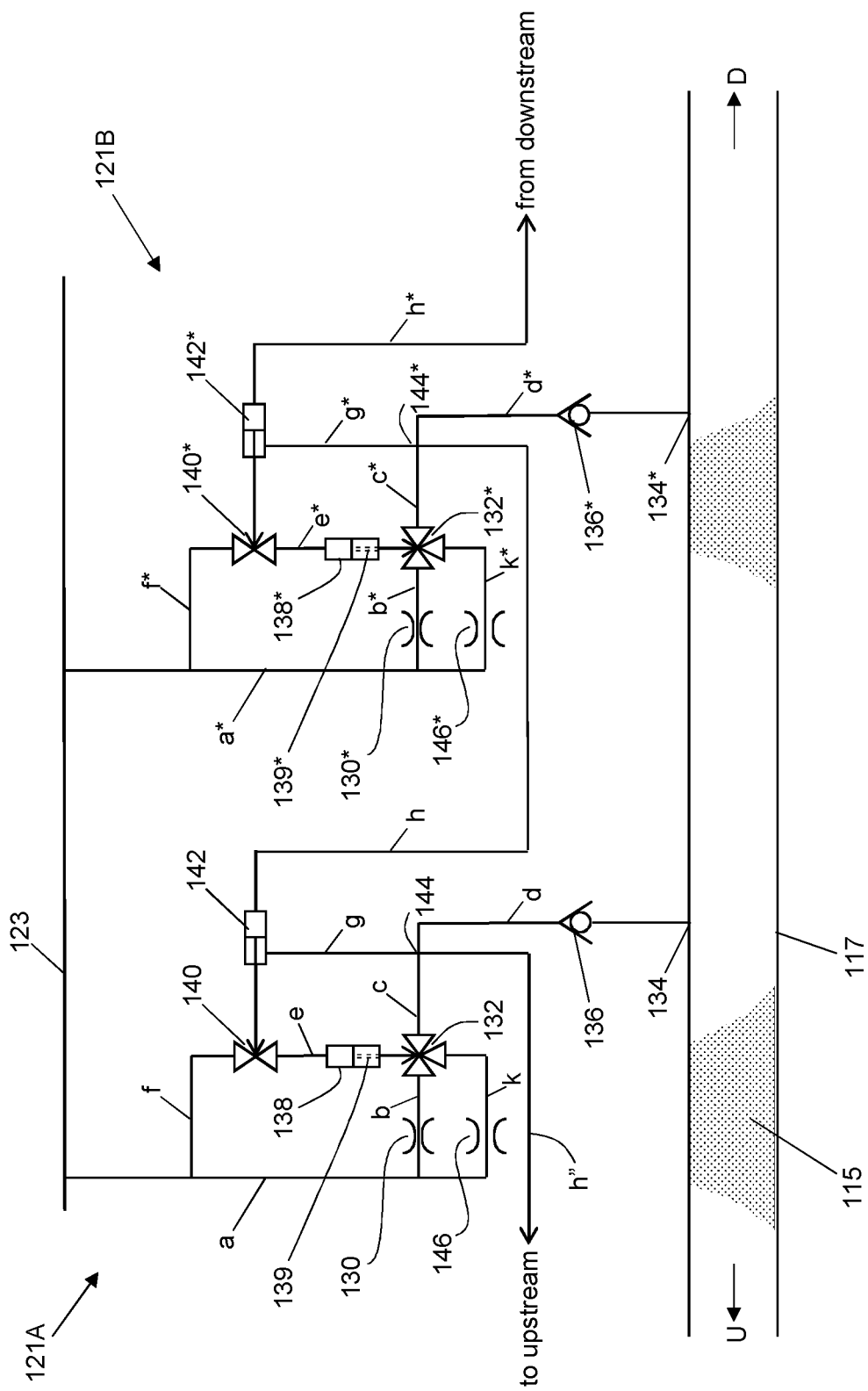
FIG. 3 shows an expanded schematic view of region A of FIG. 2, showing adjacent injector arrangements.

The system 100 includes pressure differential apparatus. In the embodiment shown, each of the injector arrangements includes pressure differential apparatus configured to detect a whether a pressure differential between each adjacent pair of injector arrangements is above or below a threshold value (as shown in FIG. 3). Each injector arrangement 121 is operable to increase the flow rate at which conveying gas is injected into the pipeline 117 from an injection flow rate to an increased injection flow rate, when a said pressure differential rises above the threshold value.

FIG. 3 shows a detailed schematic view of a region A of the system 100, including adjacent injector arrangements 121A and 121B. The downstream and upstream directions along the pipeline 117 are shown by arrows D and U, respectively. The reference numerals of injector arrangement 121B are marked with an asterisk.

The injector arrangement 121A has a low flow rate injection pathway in which compressed air (or other suitable conveying gas) is routed from the manifold 123, along gas lines a and b, and through a narrow flow restrictor 130. The narrow flow restrictor is typically of around 0.2 mm diameter, but the diameter can vary from around 0.01 to 3.0 mm, depending on the particular application. A three-way piston actuated valve 132 is positioned between lines b and c, such that the compressed air can be directed through line d, to an injection nozzle 134 and injected into the pipeline 117. A non-return valve 136 is disposed along line d to prevent backflow from the pipeline.

The injector arrangement 121A also includes a high flow rate injection pathway, which extends from the manifold 123 to the three-way valve 132, via gas line k and wider flow restrictor 146 which has a greater flow area than the flow restrictor 130. The wider flow restrictor 146 is typically of around 0.7 mm diameter, but depending on the particular application, the diameter can range from around 1.0 to 10.0 mm.

The three-way valve 132 is actuated by a piston actuator 138. The piston of the actuator 138 is connected to a gas control line e. The position of the piston actuator 138, and thus the three-way valve 132, is determined by the relative forces applied to the piston in the actuator by a return spring and pressures in line e.

A control line f extends between the manifold 123 and a piston actuated valve 140.

The valve 140 is actuated by a pressure-differential piston actuator 142. A first side of the piston actuator 142 is connected to gas line g. A second side of the actuator 142 is connected to gas line h. The position of the piston actuator 142, and thus the valve 140, is determined by the relative pressures in lines g and h. The piston actuator 142 comprises a resilient member such as a spring (not shown) which determines the threshold pressure differential required for it to change position. Optionally, the spring (or other suitable resilient member) may be adjustable, so that the threshold pressure differential can be adjusted.

Line g extends to 4-way junction 144 and is therefore in fluid pressure communication with line d. Accordingly, line g is at the same pressure as line d and thus reflects pressure in the pipeline 117 at the injection location 134.

Line h extends to the corresponding 4-way junction 144*, and so is at the pressure of line d* and thus reflects the pressure in the pipeline at the injection location 134*.

The pressure-differential piston actuators 142 and 142* therefore function as the pressure differential apparatus of the respective injector arrangements 121A and 121B.

Operation of the system 100 to convey particulate material 115 along the pipeline 117 will now be described with reference to FIGS. 4(a)-(f).

Figure 4A:
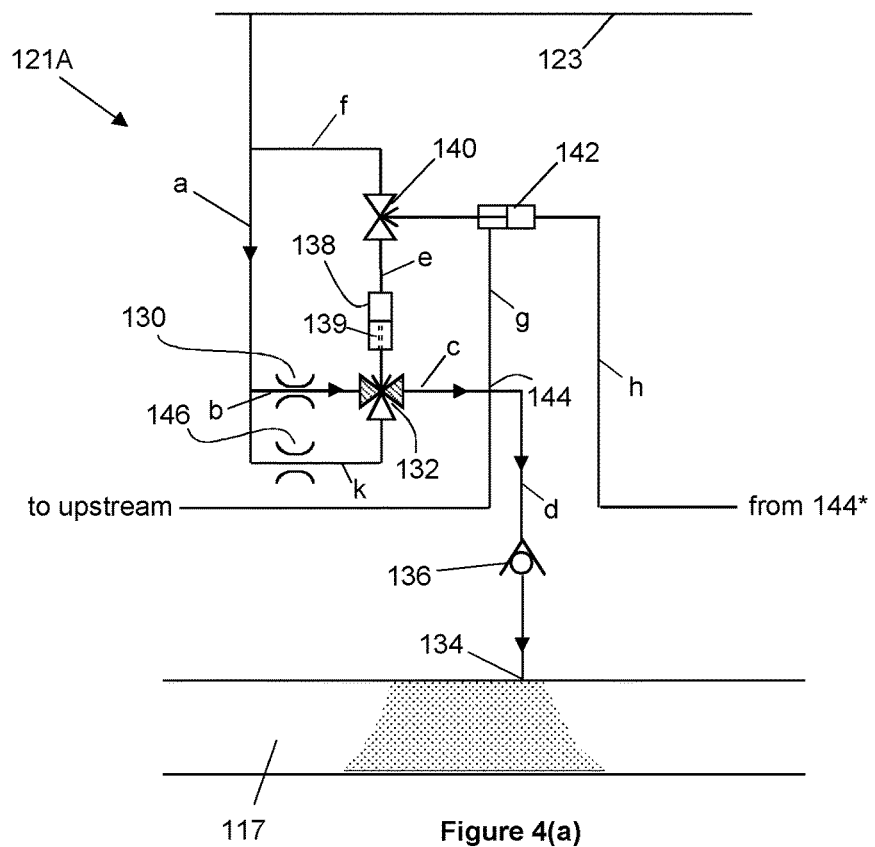
FIGS. 4(a)-(f) show the operation of the injector arrangement of FIG. 2.

FIG. 4(a) shows the configuration of the system when pressure in the pipeline at nozzle 134 is the same as the pressure in the pipeline at nozzle 134*. In this configuration, compressed air flows along the low flow rate injection pathway, from the manifold 123 through lines a, b, c and d, to the nozzle 134 (as indicated by the arrows).

The pressure drops from the high pressure of the manifold 123, to the pressure in the conveying pipeline, across the flow restrictor 130.

The valve 132 is set to open the path between lines b and c and to close off line k.

Lines g and h are at the same pressure as the respective nozzles 134 and 134*, such that the actuator 142 is in a position corresponding to valve 140 being closed.

Figure 4B:
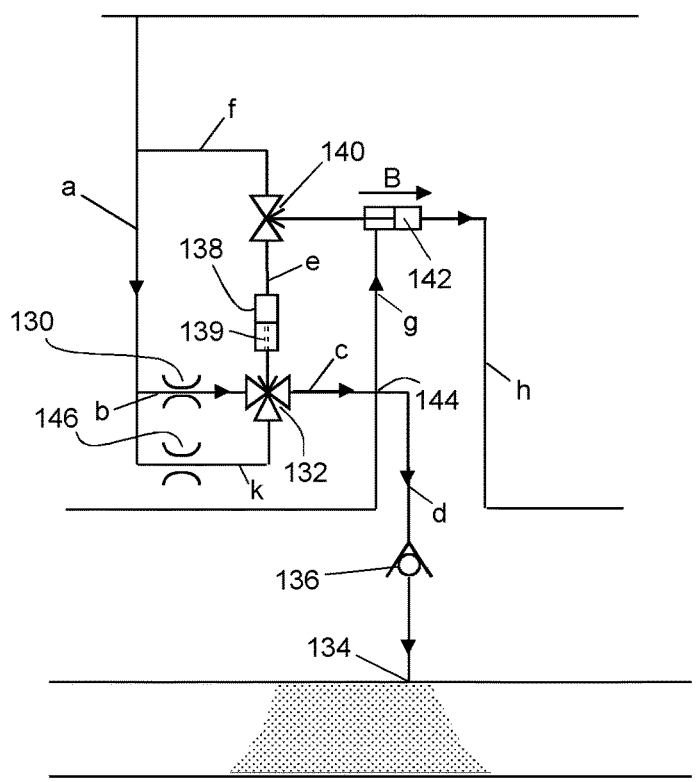

FIG. 4(b) shows the configuration of the injector arrangement 121A when the permeability of material 115 reduces in a region of the pipeline. In this situation, there is small increased pressure in the pipeline in the vicinity of the nozzle 134. This results in increased pressure in lines d and g, such that there is an above-threshold pressure differential across the actuator 142. Under the action of the pressure differential, fluid from line g enters the first side of the actuator 142 and the piston moved in the direction B and displaces fluid from the second side of the actuator into line h.

Figure 4C:
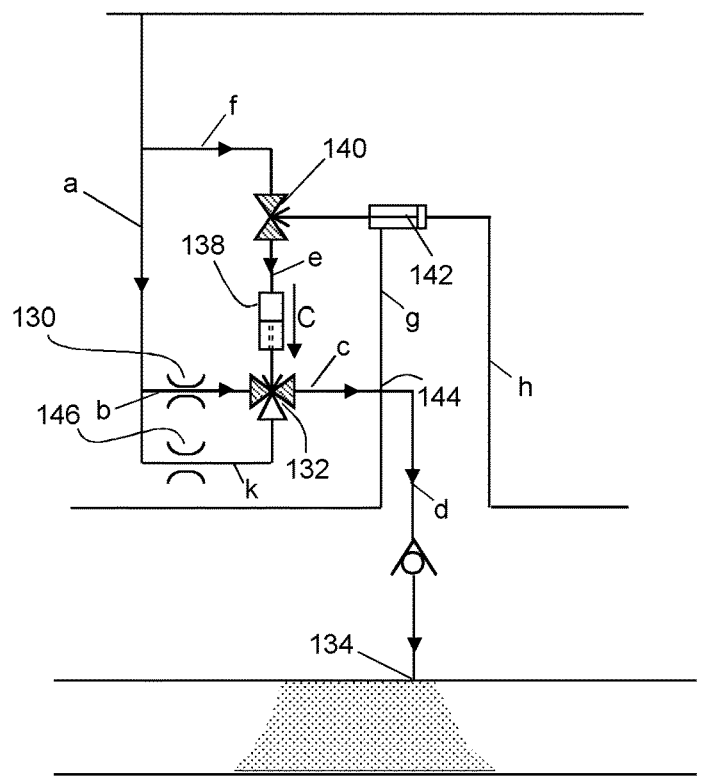

In turn, the movement of the actuator 142 causes the valve 140 to open, as shown in FIG. 4(c). Line f is at the high pressure of the manifold 123 and line a. Opening of the valve 140 causes fluid to flow through the valve and displace the piston of the actuator 138 in the direction C.

Pressure differential information can be considered to be constituted by one or more of:
the position of the pressure differential actuator 142;
the open/closed position of the valve 140;
pressure in line e;
the position of the actuator 138.

Figure 4D:
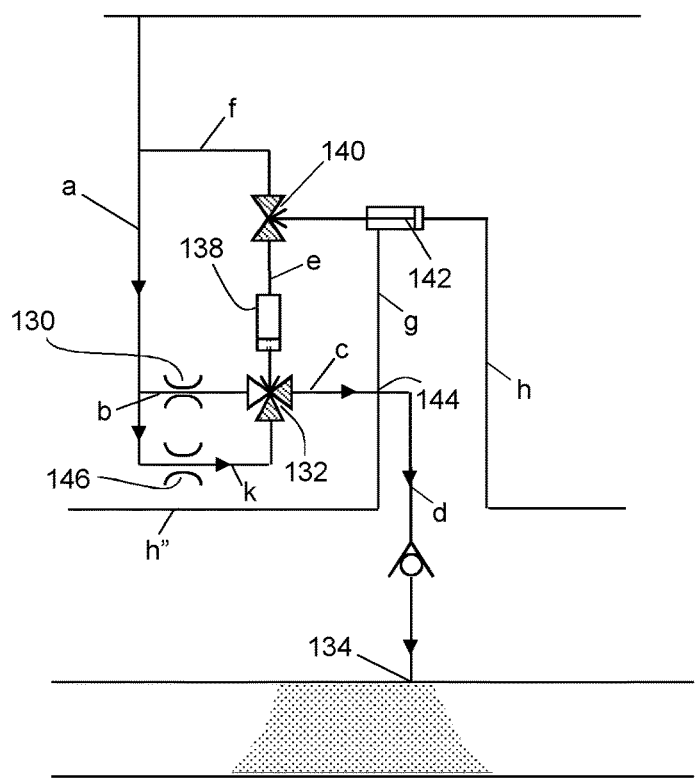
Figure 4E:
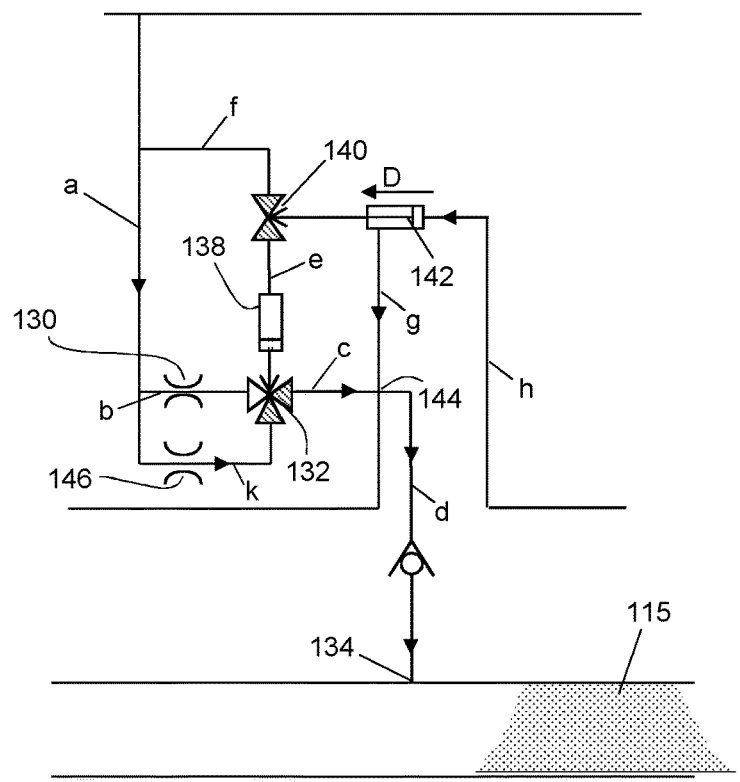

As shown in FIG. 4(d), the actuator 138 thereby switches the valve 132 to open the high flow rate pathway between lines k and c, and to close the low flow rate pathway along line b. The air now flows through the wider flow restrictor 146, such that the flow rate through lines c and d, and through the nozzle 134 is at the increased injection flow rate. The valve 132 thus forms part of a flow rate adjustment arrangement.

The increase in the flow rate of the injected conveying gas may locally increase pressure in the pipeline, for example if the material 115 does not immediately increase in permeability. In that case, the pressure in line g also increases, such that the fluid pressure differential across the actuator 142 increases further. The pressure in line h", to an adjacent upstream injector arrangement (not shown) is then also increased, and so the pressure differential across the piston actuator of the upstream injector arrangement is negative, and the upstream injector arrangement is held in the configuration shown in FIG. 4(a).

The effect of the increased flow rate of air injected into the pipeline 117 through the nozzle 134, is to increase the permeability of the particulate material 115, or break apart, or move a plug of particulate material 115. In either case, the pressure in the pipeline equilibrates and the pressure differential across actuator 142 decreases below the threshold value. As a consequence, the piston in the actuator moves in the direction D, as fluid is displaced from line h and into line g (FIG. 4(e)).

Figure 4F:
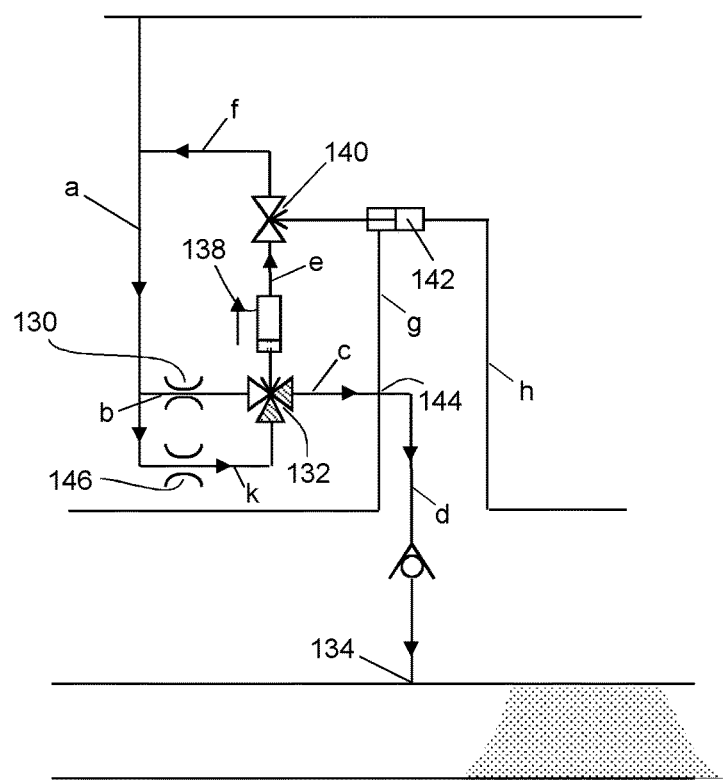

Referring now to FIG. 4(f), as the valve 140 closes, under the action of the actuator 142, air bleeds back through the valve from e into f, under the action of the sprung piston of the actuator 138 (in the direction E). This opens the low flow rate injection pathway through the valve 132 between b and c, and closes the high flow rate injection pathway through the valve between k and c and returns the injector arrangement 121A to the configuration shown in FIG. 4(a).

Accordingly, the injector arrangements 121 are configured to increase the flow rate at which compressed air is injected into the pipeline from an injection flow rate to an increased injection flow rate, when the said pressure differential rises above the threshold value, and to decrease the flow rate of the compressed air injected into the pipeline back to the injection flow rate, as soon as the detected pressure differential falls below the threshold valve. The threshold value is set at around 10 mBar (although in some circumstances this may be set at as high as around 90 mBar), so as to ensure that air is flowing through the nozzles and into the pipeline at all times. This continuous flow prevents blockage or damage of the nozzles or any other parts of the injection arrangements, by the particulate material.

Referring again to FIG. 2, the transporter apparatus 107 is provided with a pressure gauge 106, to measure the system pressure in the transporter apparatus. As mentioned above, the set point of the system pressure, i.e. the pressure at which conveying gas is delivered to the transporter 107, is regulated by the solenoid valve 125. The setting of the solenoid valve may be controlled by a controller 140 which receives pressure readings from the gauge 106.

In alternative embodiments (not shown) the system may comprise a pneumatically adjustable valve in place of the solenoid valve 125. Alternatively, the valve may be manually adjustable.

The system 100 may also be configured for the controller 150 to regulate the set point of the air pressure in the manifold, for example to maintain the manifold pressure within a pre-set range (or the same as) of the system pressure. In the embodiments of FIGS. 2-4, an increased manifold pressure has the effect of increasing both the injection flow rate and the increased injection flow rate. The pressures at which the conveying gas is injected increase or decrease commensurately.

In alternative embodiments, this can be achieved by way of variable flow restrictors in each of the injector arrangements, or in selected injector arrangements, as mentioned below.

The system 100 in addition includes terminal injector arrangements 122 near to the inlet and the outlet. Since these lack upstream and downstream adjacent injector arrangements, respectively, they differ from the injector arrangements 121. The terminal injector arrangement 122 nearest the inlet 116 may for example lack a line h", whereas the terminal injector arrangement 122 nearest the outlet need not be equipped with a pressure differential apparatus or means to adjust the injection flow rate. It will however be understood that in practice, it may be convenient for all of the terminal and non-terminal injector arrangements to be structurally the same, with redundant features of the terminal injector arrangements being disabled.

Figure 5:
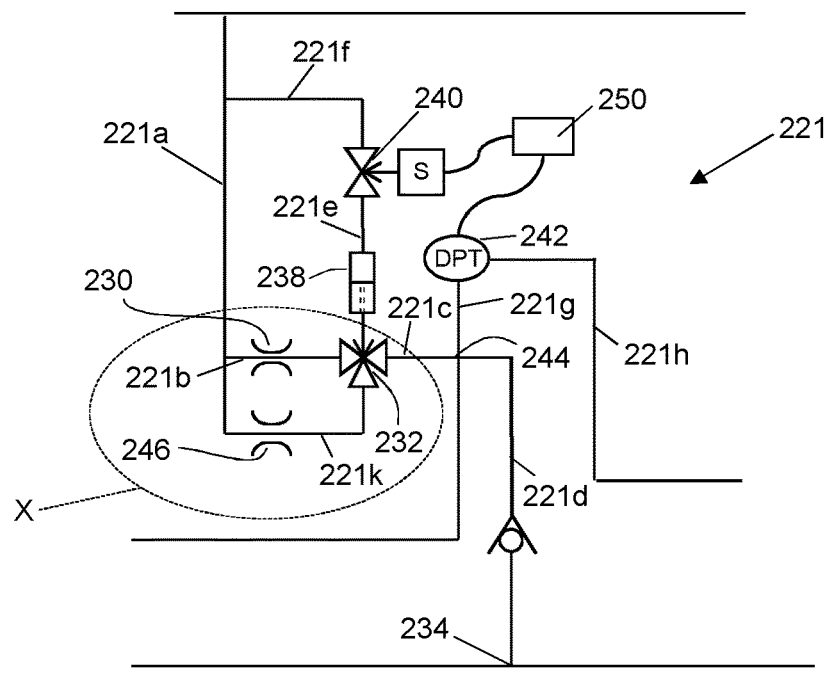
FIGS. 5-7 show alternative embodiments of an injector arrangement.

An alternative embodiment of an injector arrangement 221 is shown in FIG. 5. Features in common with injector arrangement 121A are provided with like reference numerals, incremented by 100, and the equivalent gas lines prefaced by "221".

In common with the injector arrangements 121, injector arrangement 221 includes lines 221a-d of a low flow rate injection pathway, extending through a flow restrictor 230 and a piston actuated three-way valve 232; and the high flow rate injection pathway 221k and flow restrictor 246 in place of line 221c.

The pressure differential apparatus takes the form of a pressure differential transducer 242, which communicates with lines 221g and 221h. Any suitable type of transducer may be employed, such as a transducer comprising a diaphragm coupled to a capacitive or piezoelectric device. The transducer 242 communicates with a control unit 250, configured to control a solenoid valve 240, disposed between lines 221e and 221f (c.f. valve 140 of injectors 121).

On detection of an above threshold pressure differential, the controller opens the valve 240, so as to cause air to be injected into the pipeline at the increased injection flow rate, in the manner described above.

Figure 6:
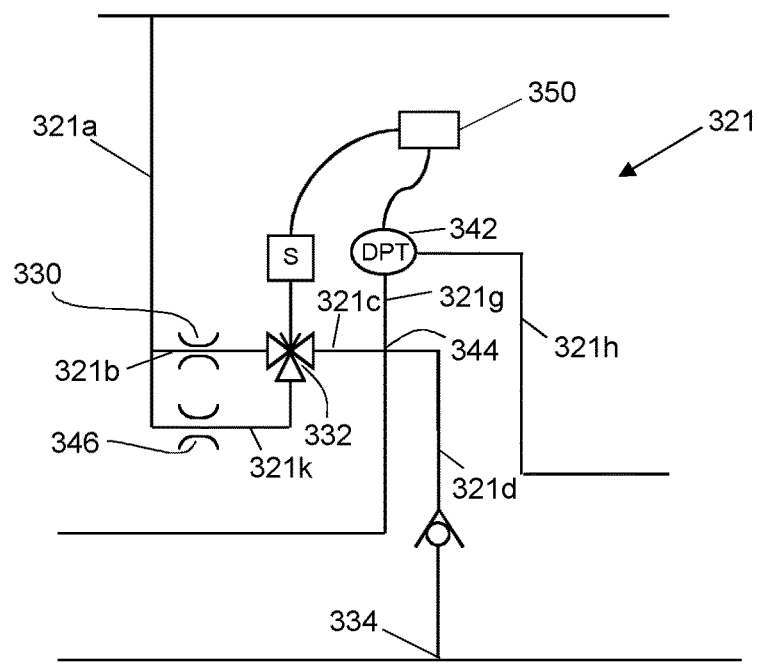

A still further embodiment of an injector arrangement 321 is shown in FIG. 6. Features in common with injector arrangement 121A are provided with like reference numerals, incremented by 200, and the equivalent gas lines prefaced by "321".

In common with the injector arrangements 121 and 221, injector arrangement 321 includes lines 321a-d of a low flow rate injection pathway; and the high flow rate injection pathway 321k and flow restrictor 346 in place of line 321c. Selection between the high and low flow rate pathways is achieved by way of an alternative flow rate adjustment arrangement, in which a solenoid actuated three way valve 332 is operable to select between the two pathways.

The valve 332 and the pressure differential apparatus (pressure differential transducer 342) communicate with a control unit 350, configured to control the position of the three way solenoid valve 340.

In alternative embodiments (not shown) the pressure differential transducers and flow rate adjustment arrangements of multiple injector arrangements (for example all of them) are controlled by a common control unit.

Figure 7:
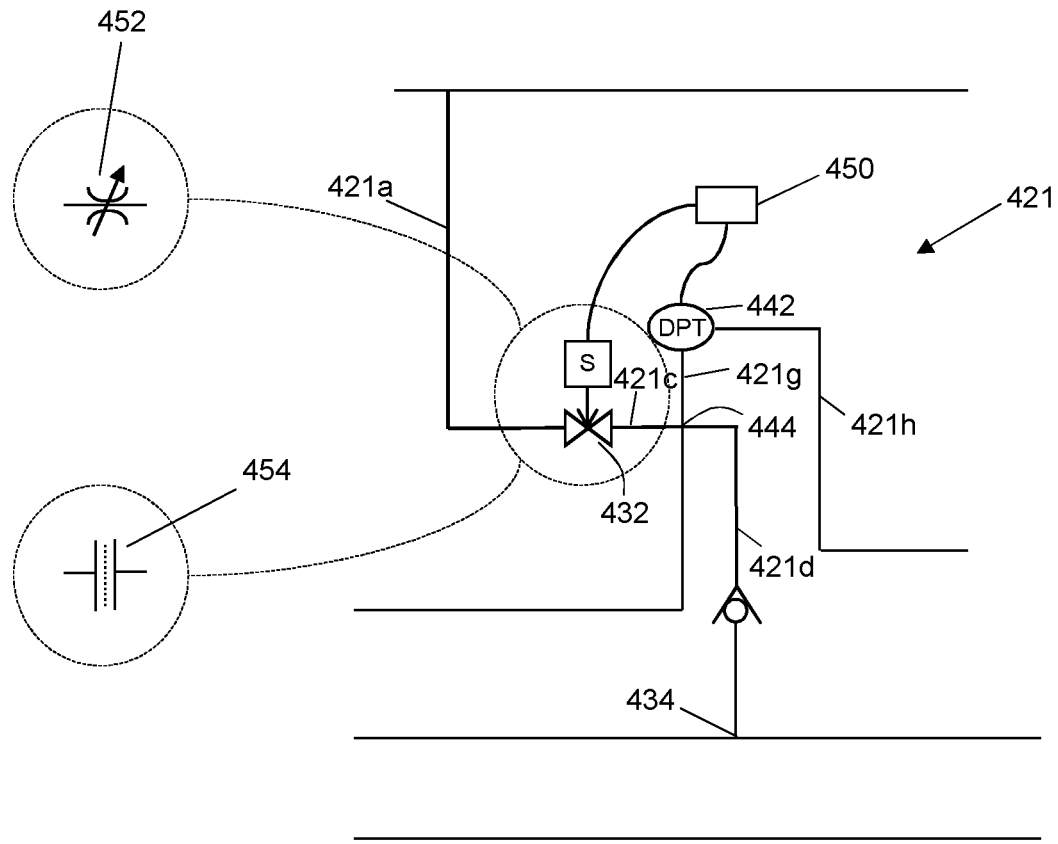

A still further embodiment of an injector arrangement 421 is shown in FIG. 7. Line 421a extends from the manifold 123 to a variable solenoid valve (e.g. a ball valve) 432. Lines 421c and 421d connect the valve 432 to the pipeline 117. As previously, lines 421g and 421h connect to a pressure differential transducer 424. The transducer 424 and the solenoid valve 432 communicate with a controller 450, which regulates the valve position so as to vary the flow rate downstream of the valve 432 between the injection flow rate and increased injection flow rate, depending on the measured pressure differential.

In alternative embodiments, the arrangement by which injection flow rate may be varied may include a variable flow restrictor 452, or a variable orifice plate 454, in place of the solenoid valve 432.

A common control unit may also communicate with, or provide the functionality of, the controller 150, discussed above in relation to FIG. 2. The processing capability of the system may be separate from the controller/control unit(s), for example in the form of a computer processor, or may be distributed between them. Conveniently, a system in accordance with the invention may have a user interface, such as a personal computing device or control station, by which control over any of the controller or control units may be effected.

Any of the injector arrangements 121, 221, 321 may be provided with alternative high and low flow rate injection pathways, as marked by area X in FIG. 5.

Figure 8:
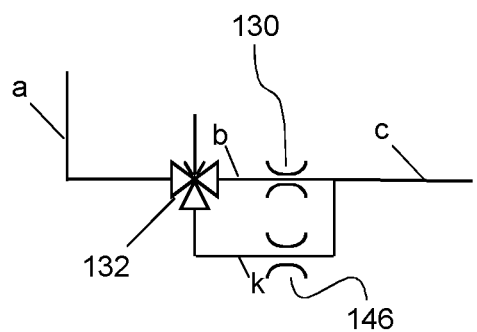
FIG. 8 shows an alternative embodiment of region X marked in FIG. 5.

FIG. 8 shows an alternative arrangement of the components of a flow rate adjustment arrangement in area X, which may be employed in relation to any of the injector arrangements described herein. The lines b and k, and the respective flow restrictors 130 and 146, are positioned downstream of the three way valve.

Figure 9:
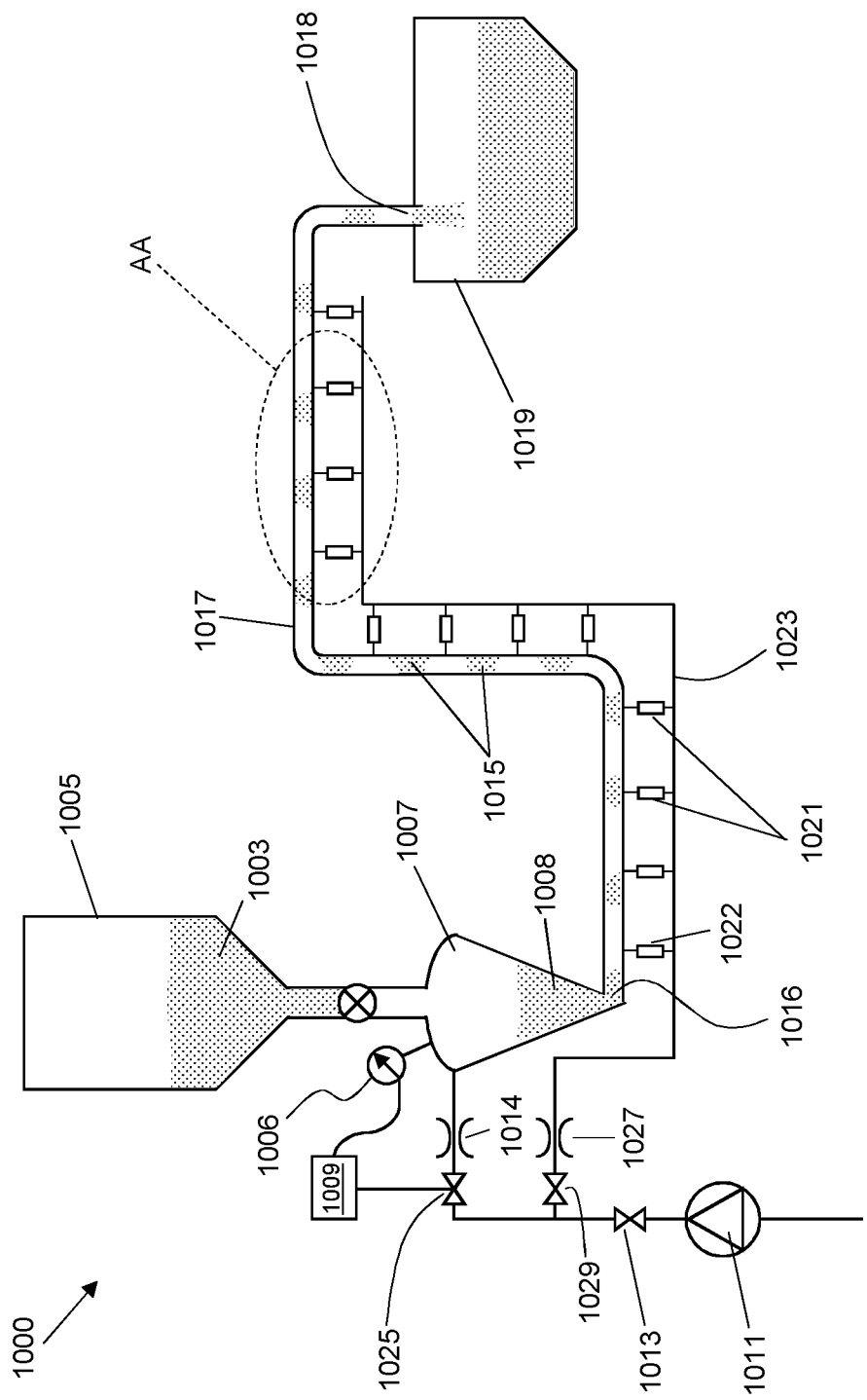
FIG. 9 shows schematic view of an alternative embodiment of a conveying system having a plurality of injector arrangements along a conveying pipeline.

FIG. 9 shows an alternative embodiment of a system 1000 for conveying particulate material in accordance with the invention. Features in common with the system 100 are provided with like reference numerals, incremented by 900.

Figure 10:
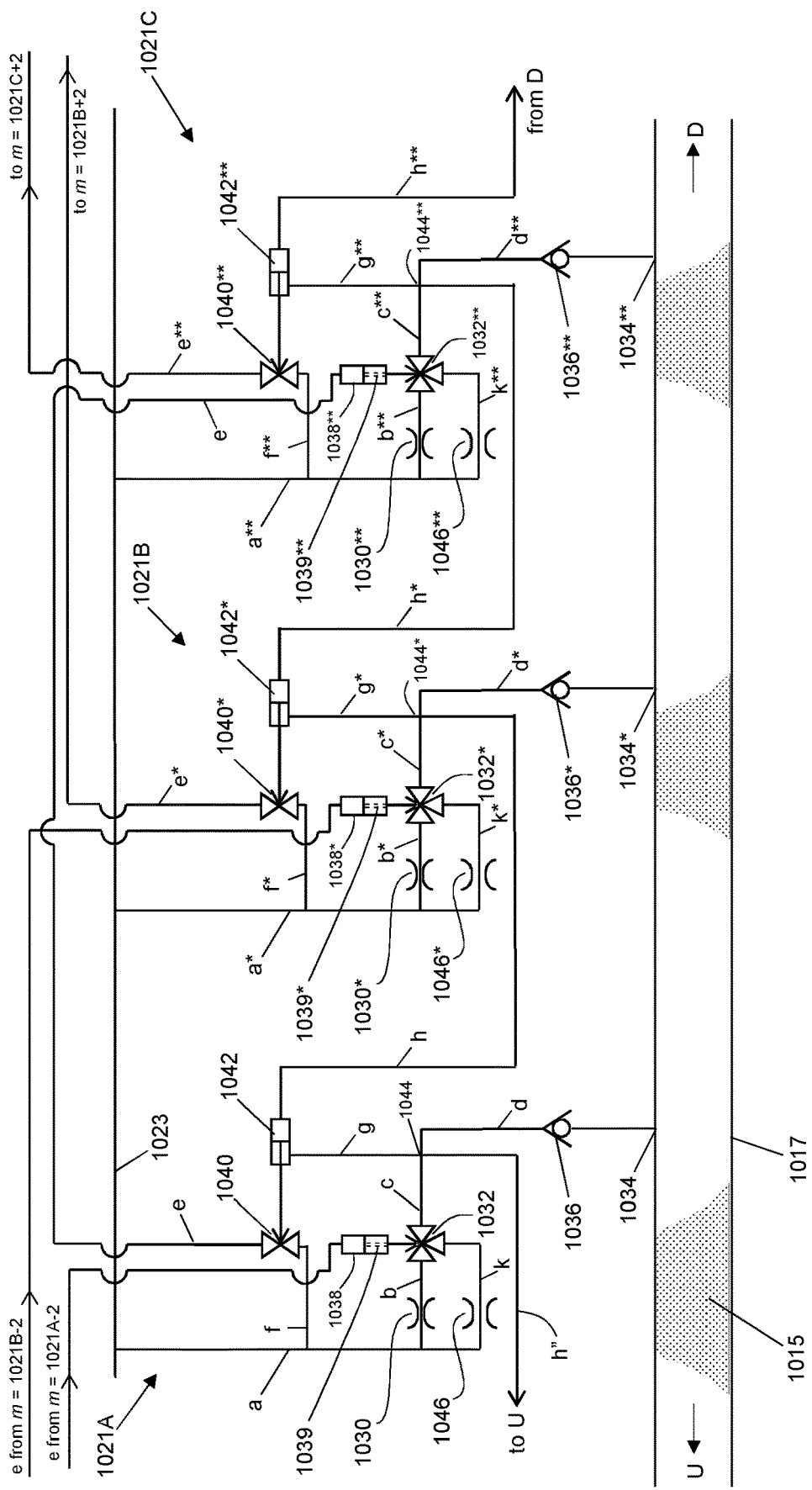
FIG. 10 shows an expanded schematic view of region AA of FIG. 9, showing a series of three successive injector arrangements.

Each of the injector arrangements 1021 is associated with (in this embodiment, includes) a pressure differential apparatus configured to detect a whether a pressure differential between each adjacent pair of injector arrangements is above or below a threshold value (as shown in FIG. 10). Each injector arrangement 1021 is operable to increase the flow rate at which conveying gas is injected into the pipeline 1017 from an injection flow rate to an increased injection flow rate, when a detected pressure differential a predetermined number of injector arrangements upstream thereof rises above the threshold value.

In alternative embodiments (not shown) the system is configured such that each injector arrangement responds to a detected pressure differential downstream thereof.

FIG. 10 shows a detailed schematic view of a region AA of the system 1000, including adjacent injector arrangements 1021A, 1021B and 1021C. The downstream and upstream directions along the pipeline 1017 are shown by arrows D and U, respectively. The reference numerals of injector arrangement 1021B are marked with "*", and those of injector arrangement 1021C are marked with "**".

As described above in relation to the injector arrangement 121A of the system 100, the injector arrangement 1021A has a low flow rate injection pathway in which compressed air (or other suitable conveying gas) is routed from the manifold 1023, along gas lines a and b, and through the narrow flow restrictor 1030. A three-way piston actuated valve 1032 is positioned between lines b and c, such that the compressed air can be directed through line d, to an injection nozzle 1034 and injected into the pipeline 1017. A non-return valve 1036 is disposed along line d to prevent backflow from the pipeline.

The injector arrangement 1021A also includes a high flow rate injection pathway extending from the manifold 1023 to the three-way valve 1032, via gas line k and wider flow restrictor 1046.

The three-way valve 1032 is actuated by a piston actuator 1038. The piston of the actuator 1038 is connected to a gas control line e that runs from an injector arrangement two injection locations upstream of the injector arrangement 1021A (not shown in the figure). Similarly, the injector arrangement 1021B has a piston actuator 1038* connected to a line e from an injector arrangement two injection locations upstream (and thus only on location upstream of the injector arrangement 1021A), whereas the line e of injector arrangement 1021A extends to the actuator 1038 of injector arrangement 1021**C, two injection locations downstream.

The position of the piston actuator 1038, and thus the three-way valve 1032, is determined by the relative forces applied to the piston in the actuator by a return spring and pressures in the line e extending from the upstream injector arrangement.

A control line f extends between the manifold 1023 and a piston actuated valve 1040.

The valve 1040 is actuated by a pressure-differential piston actuator 1042. A first side of the piston actuator 1042 is connected to gas line g. A second side of the actuator 1042 is connected to gas line h. The position of the piston actuator 1042, and thus the valve 1040, is determined by the relative pressures in lines g and h. The piston actuator 1042 comprises a resilient member such as a spring (not shown) which determines the threshold pressure differential required for it to change position, as described above.

Line g extends to 4-way junction 1044 and is therefore in fluid pressure communication with line d. Accordingly, line g is at the same pressure as line d and thus reflects pressure in the pipeline 1017 at the injection location 1034.

Line h extends to the corresponding 4-way junction 1044*, and so is at the pressure of line d* and thus reflects the pressure in the pipeline at the injection location 1034*.

The pressure-differential piston actuators 1042, 1042* and 1042** function as the pressure differential apparatus of the respective injector arrangements.

Operation of the system 1000 is generally analogous to operation of the system 100. When pressure in the pipeline at nozzle 1034 is the same as the pressure in the pipeline at nozzle 1034*, compressed air flows along the low flow rate injection pathway of each of the injector arrangements 1021A-C, through their respective lines a-d (and a*-d* and a-d respectively) to the nozzles 1034-1034**.

The valve 1032 of the injector arrangement 1021A is set to open the path between lines b and c and to close off line k. Lines g and h are at the same pressure as the respective nozzles 1034 and 1034*, such that the actuator 1042 is in a position corresponding to valve 1040 being closed. The corresponding valves of the other injector arrangements are in the same configuration.

When a portion of the material 1015 of locally reduced permeability passes or occurs between the nozzles 1034 and 1034*, an above-threshold pressure differential may occur across the actuator 1042. Under the action of this detected pressure differential, fluid from line g enters the first side of the actuator 1042 fluid is displaced into line h.

This causes the valve 1040 to open. In the injector arrangements of the system 1000, opening of the valve 1040 exposes the line e the high pressure in line f (which is at the high pressure of the manifold 1023 and line a).

Unlike the injector arrangement 121A of system 100, in use of the injector arrangement 1021A, opening of the valve 1040 causes fluid to flow through the valve through line e and displace the piston of the actuator 1038 of the injector arrangement 1021**C, two injector arrangements downstream.

This switches the valve 1032 to open the high flow rate pathway between lines k and c, and to close the low flow rate pathway along line b, of the injector arrangement 1021C. The flow rate through the nozzle 1034** is then at the increased injection flow rate.

It is to be understood that the injection flow rate through each injector arrangement 1021 of the system 1000 is similarly regulated based on detected pressure differentials between two further adjacent injector arrangements upstream thereof (with the exception of terminal injection arrangements 1022 near the inlet 1016).

In this way, the system 1000 ensures that reduced permeability material passes the injection location at an increased injection flow rate as it progresses downstream along the conveying pipeline 1017. The possibility of the reduced permeability region having progressed downstream of where injection flow rate is increased (as might happen during the period required for the system to respond to the detected pressure differential), is thus significantly reduced. In turn, this reduces the likelihood of exacerbating the reduction of particulate material permeability, or of forming or further compressing a material plug.

The increase in the flow rate of the injected conveying gas may locally increase pressure in the pipeline, for example if the material permeability does not immediately increase. In that case, the pressure in line g also increases, such that the fluid pressure differential across the actuator 1042 increases further. The pressure in line h", to an the injector arrangement adjacent to and upstream of injector arrangement 2021A (not shown) is then also increased, and so the pressure differential apparatus thereof also detects an above threshold pressure differential and causes the injection flow rate of the injector arrangement 2021B to increase.

In common with the system 100, in use of the system 1000, once the detected pressure differential between injector arrangements 1021A and 1021B (or any two adjacent injector arrangements) falls below the threshold value, the differential pressure actuator 1042 returns to its original position, the valve 1040 closes and the pressure in line e falls, until the injector arrangement 1021C reverts to the lower injection flow rate.

It must be further appreciated that injector arrangements further upstream or downstream of the region AA of the system 1000 (and indeed the region A of the system 100) are capable of independently operating in this way. Thus, multiple transient variations in particulate material permeability can be simultaneously addressed so as to maintain stable conveying.

The inventors have found that the present invention provides for between around 20%-50% reduction in conveying gas consumption in comparison to conventional dense phase conveying systems having multiple injection points (such as those discussed in the introductory section above).

In addition, if a blockage occurred when the apparatus as a consequence of the apparatus being shut down during conveying (e.g., to address a technical problem), on restarting, blockages in the conveying pipeline are cleared automatically, as the injection flow rate increases towards the downstream end of any blockage, thereby progressively removing static material from the end of the blockage. This process progresses upstream, until reliable conveying is re-established.

Whilst the invention has been described in connection with the foregoing illustrative embodiments, various modifications, additions and alterations may be made to the invention by one skilled in the art without departing from the scope of the claimed invention.

The invention claimed is:

1. A system for conveying particulate material, comprising:
   a conveying pipeline having an inlet for receiving a quantity of particulate material and conveying gas, and an outlet, the system configured to maintain the inlet at a higher pressure of conveying gas than the outlet;
   a plurality of injector arrangements along the conveying pipeline for injecting a continuous flow of conveying gas into the pipeline; and
   each injector arrangement associated with a pressure differential apparatus for detecting whether a pressure differential in the pipeline between the injector arrangement and adjacent injector arrangement is above or below a threshold value;
   in use, each injector arrangement operable to increase the flow rate at which conveying gas is injected into the pipeline from an injection flow rate to an increased injection flow rate, when a detected pressure differential a predetermined number of injector arrangements upstream thereof rises above the threshold value.

2. A system according to claim 1, wherein each injector arrangement may be operable to increase the flow rate at which conveying gas is injected into the pipeline, when the detected pressure differential is between two further injector arrangements adjacent one another.

3. A system according to claim 2, operable to increase the flow rate of an $n^{th}$ injector arrangement is increased based on a pressure differential between the $(n-m)^{th}$ and the adjacent $(n-m-1)^{th}$ injector arrangement, wherein m is 1 or 2.

4. A system according to claim 2, operable to increase the flow rate of an $n^{th}$ injector arrangement is increased based on a pressure differential between the $(n+m)^{th}$ and the adjacent $(n+m+1)^{th}$ injector arrangement wherein m is 1 or 2.

5. A system according to claim 1, comprising a transporter apparatus for delivering a quantity of particulate material under a system pressure of a conveying gas, to the inlet of the conveying pipeline and/or a receiving vessel, for receiving particulate material from the conveying pipeline, the receiving vessel being configured to be maintained at a pressure below the pressure at the inlet in use.

6. A system according to claim 1, wherein each injector arrangement is configured to reduce the flow rate of conveying gas injected into the pipeline from the increased injection flow rate to the injection flow rate, when the detected pressure differential falls below the threshold value.

7. A system according to claim 1, wherein each injector arrangement comprises pressure differential apparatus.

8. A system according to claim 7, wherein the pressure differential apparatus of each injector arrangement comprises a valve coupled to a pressure differential actuator, a first side of the pressure differential actuator being in fluid communication with the injector arrangement and a second side of the pressure differential actuator being in fluid communication with an adjacent injector arrangement.

9. A system according to claim 7, wherein the pressure differential apparatus of each injector arrangement is configured to convey pressure differential information to a further injector arrangement a predetermined number of injector arrangements upstream or downstream thereof.

10. A system according to claim 1, wherein the injector arrangements are supplied with conveying gas from a high pressure manifold, and wherein each injector arrangement comprises a flow rate adjustment arrangement, the flow rate adjustment arrangements configured to vary the setting of an adjustable device, so as to vary a pressure drop between the manifold and the gas injected into the conveying pipeline.

11. A system according to claim 1, wherein each injector arrangement comprises a high flow rate injection pathway and a low flow rate injection pathway, between a source of conveying gas and the conveying pipeline, and a flow rate adjustment arrangement configured to selectively route the conveying gas via the high flow rate injection pathway, or via the low flow rate injection pathway.

12. A system according to claim 11, wherein the high flow rate injection pathway comprises a large diameter flow restrictor, and the low flow rate injection pathway comprises a small diameter flow restrictor.

13. A system according to claim 11, wherein each flow rate adjustment arrangement comprises a multi-way valve, operable to select the high or low flow rate injection pathway.

14. A system according to claim 1, wherein the system is a dense phase conveying system, for transporting dense phase particulate materials.

15. A method of conveying particulate material along a conveying pipeline, the method comprising;
introducing a quantity of the particulate material into the pipeline;
conveying the particulate material along the pipeline under the action of a flow of a conveying gas along the conveying pipeline;
injecting a continuous flow of conveying gas into the pipeline at a plurality of injection locations along the pipeline; and
increasing the flow rate of the conveying gas injected into the pipeline at a said location, from an injection flow rate to an increased injection flow rate, when a pressure differential rising above a threshold value is detected in the pipeline between adjacent injection locations a predetermined number of injection locations upstream or downstream thereof.

16. A method according to claim 15, wherein the flow rate at the nth injection location may be increased based on a pressure differential;
between the $(n+m)^{th}$ and the adjacent $(n+m+1)^{th}$ injection location; or
between the $(n-m)^{th}$ and the adjacent $(n-m-1)^{th}$ injection location;
wherein m is 1 or 2.

17. The method of claim 16, comprising increasing the injection flow rate at one or more injection locations upstream or downstream of the first injection location.

18. A system for conveying particulate material, comprising:
a conveying pipeline having an inlet for receiving a quantity of particulate material and conveying gas, and an outlet, the system configured to maintain the inlet at a higher pressure of conveying gas than the outlet;
a plurality of injector arrangements along the conveying pipeline for injecting a continuous flow of conveying gas into the pipeline; and
each injector arrangement associated with a pressure differential apparatus for detecting whether a pressure differential in the pipeline between the injector arrangement and adjacent injector arrangement is above or below a threshold value;
in use, each injector arrangement operable to increase the flow rate at which conveying gas is injected into the pipeline from an injection flow rate to an increased injection flow rate, when a detected pressure differential between two further injector arrangements a predetermined number of injector arrangements upstream or downstream thereof rises above the threshold value.

19. A system according to claim 18, wherein each injector arrangement comprises a pressure differential apparatus, and wherein the pressure differential apparatus of each injector arrangement is configured to convey pressure differential information to a further injector arrangement a predetermined number of injector arrangements upstream or downstream thereof.

20. A system according to claim 18, operable to increase the flow rate of an $n^{th}$ injector arrangement is increased based on a pressure differential between the $(n-m)^{th}$ and the adjacent $(n-m-1)^{th}$ injector arrangement, wherein m is ±1 or ±2.

* * * * *